Figure 1:
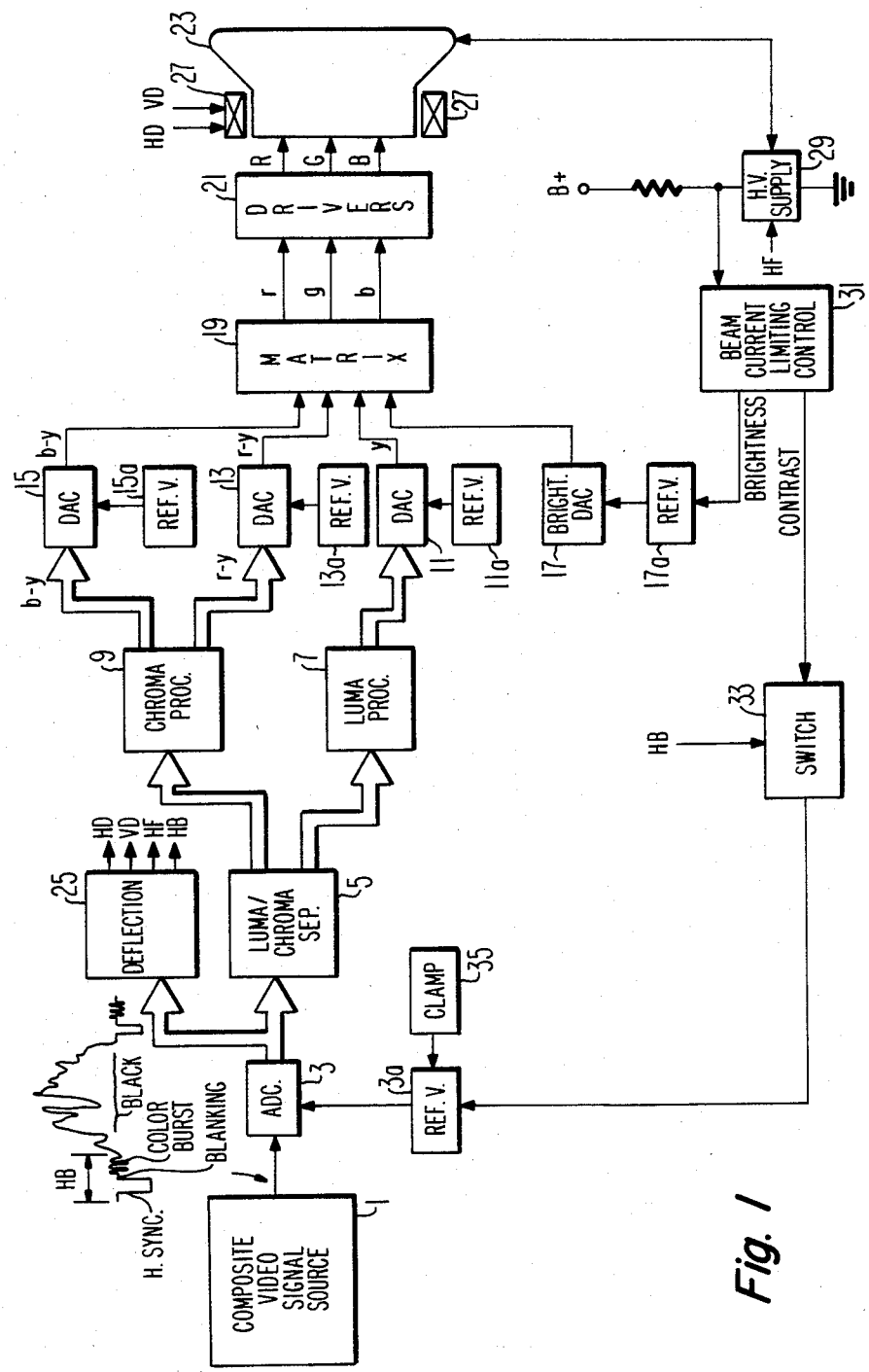

United States Patent [19]

Stoughton et al.

[11] Patent Number: 4,521,811
[45] Date of Patent: Jun. 4, 1985

[54] BEAM CURRENT LIMITING ARRANGEMENT FOR A DIGITAL TELEVISION SYSTEM

[75] Inventors: John W. Stoughton; Donald H. Willis, both of Marion County, Ind.

[73] Assignee: RCA Corporation, Princeton, N.J.

[21] Appl. No.: 646,033

[22] Filed: Aug. 30, 1984

Related U.S. Application Data

[63] Continuation-in-part of Ser. No. 606,022, May 2, 1984, abandoned.

[51] Int. Cl.³ ............... H04N 5/16; H04N 5/197; H04N 5/21; H04N 9/535
[52] U.S. Cl. ..................... 358/243; 358/168; 358/169; 358/34
[58] Field of Search ............ 358/243, 168, 169, 170, 358/172, 174, 176, 21 R, 27, 34

[56] References Cited

U.S. PATENT DOCUMENTS 4,126,884 11/1978 Shanley ............................ 358/21
4,207,591 6/1980 Parker ............................. 358/34
4,253,110 2/1981 Harwood et al. .................. 358/74
4,403,253 9/1983 Morris et al. ..................... 358/160

OTHER PUBLICATIONS

Pages 57 through 63 of the ITT "Digit 2000 VLSI Digital TV System" Product Description published by the *Intermettal Division of ITT* in Sep. 1983.

Primary Examiner—Tommy P. Chin
Attorney, Agent, or Firm—Eugene M. Whitacre; Paul J. Rasmussen; Peter M. Emanuel

[57] ABSTRACT

A beam current limiting (BCL) control apparatus for a digital television system includes a control unit for controlling the reference voltage for the analog-to-digital converter (ADC), which converts the analog composite video signal, including both luminance and chrominance components, to corresponding digital samples, so as to reduce excessive beam currents. A switching circuit prevents the reference voltage from being changed in response to the beam current during horizontal blanking intervals so as to inhibit interference with digital synchronization component detection and automatic chrominance control. A clamping circuit is coupled to the ADC to inhibit the conversion of portions of the composite video signal extending from the black level (0 IRE units) to the sync tips from being affected by the BCL operation. This inhibits the BCL operation from adversely affecting the reproduction of details in dark portions of an image.

8 Claims, 2 Drawing Figures

BEAM CURRENT LIMITING ARRANGEMENT FOR A DIGITAL TELEVISION SYSTEM

This is a continuation-in-part of application Ser. No. 606,022, filed May 2, 1984 now abandoned.

The present invention concerns a beam current limiting arrangement for a digital television system.

In a television receiver or monitor it is desirable to limit the amount of beam current drawn by the picture tube (or kinescope) to prevent blooming (a degradation of the electron beam spot size) and warping of the mask of the picture tube due to heat.

In a digital television system beam current limiting can be accomplished by changing the reference voltages for the digital-to-analog converters which convert the digitally processed luminance and color difference signals (or I and Q signals) to corresponding analog signals. Such a beam current limiting (BCL) apparatus is provided by "Digit 2000 VLSI Digital TV System" available as a group of integrated circuits from the Intermetall Division of ITT Corporation, Freiburg, West Germany. This system is described in a user document of the same name published by ITT.

In the BCL apparatus of the type described above, since the reference voltages for three different digital-to-analog converters are controlled, mismatches may occur which cause color errors in the reproduced image, especially at low beam current levels near the black level (0 IRE units) of the video signal.

The digital television system described above also includes an automatic kinescope bias (AKB) control network for maintaining a desired black current conduction condition. The AKB control network operates by coupling black level reference signals to the drivers of the kinescope and comparing resultant signals produced by the drivers to predetermined levels to generate bias control signals. While such an AKB control network would theoretically compensate for the color error resulting from mismatches produced by the operation of the BCL apparatus, the BCL apparatus is disabled from operating during the operation of the AKB control network to prevent erroneous black reference signals from being generated and sensed during AKB operation. Thus, the desirable compensation described above is not provided.

In accordance with an aspect of the present invention, in a digital television system a beam current limiting control signal controls the reference voltage for the analog-to-digital converter which converts an analog composite television signal such as a composite video signal, representing both luminance and chrominance information, to corresponding digital samples. In this manner, the proportionate relationship between luminance and chrominance components is substantially unaffected by the beam current limiting operation and the color errors described above are correspondingly overcome.

In accordance with another aspect of the invention, the beam current control signal is disabled from affecting the reference voltage for the analog-to-digital converter during horizontal blanking intervals. This avoids errors in signal processing functions that occur during the horizontal blanking interval such as synchronization pulse detection and sensing the amplitude of the color burst component for the purpose of automatic chroma control (ACC).

In accordance with another aspect of the invention, a clamp circuit coupled to the analog-to-digital converter prevents the conversion of portions of the analog composite video signal near the black level (0 IRE units) from being substantially affected by the beam current control signal. This reduces the loss details in dark areas of the image.

Figure 2:
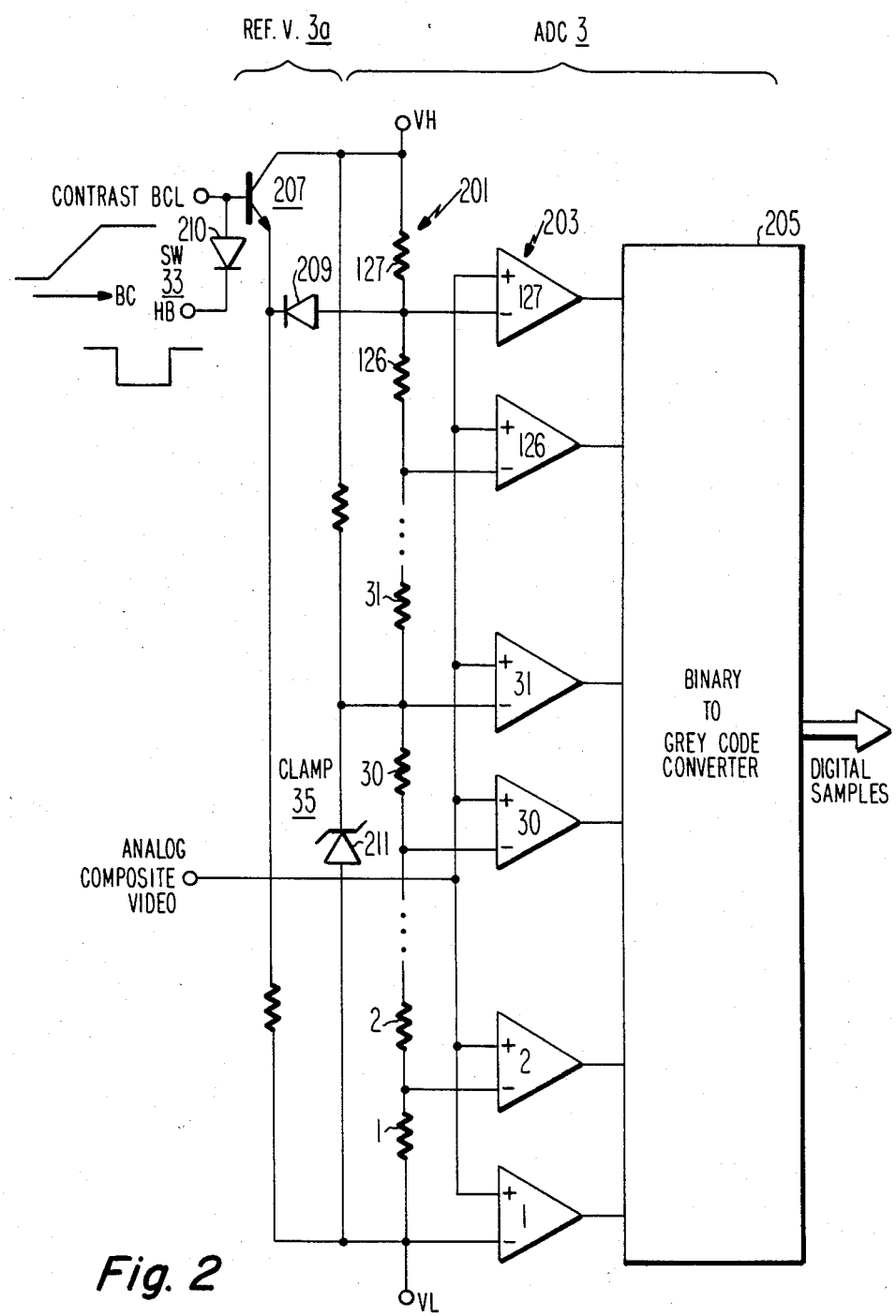

These and other aspects of the present invention will be described in detail with reference to the accompanying Drawing in which:

FIG. 1 is a block diagram of a digital television system including a beam current limiting arrangement constructed in accordance with the present invention; and FIG. 2 is a schematic diagram of an implementation of a portion of the beam current limiting arrangement shown in FIG. 1.

The television system shown in FIG. 1 includes a source of an analog composite video signal, including luminance, chrominance and synchronization components, as is graphically indicated by the associated waveform, is coupled to an analog-to-digital converter (ADC) 3 which produces digital samples of the composite video signal. ADC 3 receives a sampling signal having a frequency which satisfies the Nyquist criteria (e.g., a frequency four times the frequency of the color subcarrier) from a sampling signal generator (not shown). The sampling signal generator also generates clock signals for other digital portions of the television system. The digital samples representing the composite video signal are coupled (as indicated by the double-line arrow) to a luminance/chrominance (luma/chroma) signal component separator 5 such as a digital comb filter. Luma/chroma separator 5 produces separate groups of digital samples representing luminance and chrominance information. The digital luminance samples (y) are coupled to a digital luminance processor 7 which processes the digital luminance samples to control the contrast, peaking and other characteristics of a reproduced image. The digital chrominance samples are coupled to a digital chrominance processor 9 which demodulates the chrominance signals to produce digital color difference samples (r-y and b-y) and processes the digital color difference samples to control the saturation and tint of a reproduced image. The processed digital luminance samples and the processed digital color difference samples are converted by respective digital-to-analog converters (DACs) 11, 13 and 15 to corresponding analog signals. Another DAC 17 converts a digital word representing the brightness of a reproduced image to a corresponding d.c. signal. The luminance, brightness and color difference signals are additively combined by a matrix 19 to produce low level red (r), green (g) and blue (b) color signals. The low level color signals are suitably amplified by respective drivers of a driver unit 21 and the resulting amplified red (R), green (G) and blue (B) color signals are coupled to respective electron guns of a picture tube 23.

The digital samples representing the composite video signal are also coupled to a deflection unit 25 which separates horizontal and vertical synchronization components from the digital composite video samples in order to generate horizontal and vertical deflection signals (HD and VD) for deflection coils 27 associated with picture tube 23. A horizontal flyback pulse (HF) generated by deflection unit 25 in connection with the generation of the horizontal deflection signal is coupled to a high voltage power supply 29. High voltage power supply 29 generates the high operating voltage for picture tube 23. Deflection unit 25 also generates a horizontal blanking pulse (HB) for each horizontal synchronization pulse. The duration of each horizontal blanking encompasses a respective horizontal synchronization pulse, a respective blanking (or "back porch") level following the horizontal synchronization pulse and a respective color burst component superimposed on the black level as is indicated by the waveform of the analog composite video signal shown in FIG. 1.

A beam current limiting (BCL) control unit 31 senses the level of a current, conventionally known as a "resupply" current, drawn from a source of supply voltage (B+) coupled to high voltage supply 29 to determine the magnitude of beam current generated by picture tube 23 in order to generate control signals for reducing the beam current should it exceed a predetermined threshold. A "brightness" beam current limiting (BCL) control signal is coupled to a reference voltage source 17a which supplies a reference voltage to brightness DAC 17 to reduce the brightness of the reproduced image and thereby the beam current should the beam current be excessive.

The digital television system so far described may be constructed using the integrated circuits of the ITT digital television system referred to above.

In the ITT digital television system, a BCL control signal is also coupled to reference voltage supply units 11a, 13a and 15a which supply respective individual reference voltages to luminance and color difference DACs 11, 13 and 15. The BCL control signal determines the level of reference voltage and thereby the amplitude of analog output signal of the respective D/A converter so as to reduce excessive beam current drawn by picture tube 21.

Unfortunately, it has been found that when the reference voltage of luminance and color difference DACs 11, 13 and 15 are changed in response to a BCL control signal, the changes of the reference voltages may not track (be proportional to) one another. Such reference voltage tracking errors cause corresponding amplitude tracking errors of the luminance and two color difference signals produced by DACs 11, 13 and 15 and thereby tend to produce color errors in the reproduced image. The color errors are most perceptable under low light image conditions where reference voltage mismatches may correspond to relatively large portions of the amplitudes of the output signals of DACs 11, 13 and 15.

In accordance with an aspect of the present invention, to avoid color errors, BCL control unit 31 does not control the individual reference voltages of luminance and color difference DACs 11, 13 and 15 (it still controls the reference voltage for brightness DAC 17) but instead, controls the single reference voltage for ADC 3 which converts the composite video signal, including both luminance and chrominance components, to corresponding digital samples. Since changes in the reference voltage for ADC 3 affect both luminance and chrominance components and the various color components of the chrominance component in the same manner, proportionality between the components is maintained and color errors are therefore not produced.

Specifically with respect to FIG. 1, BCL control unit 31 generates a "contrast" BCL control signal which is coupled through a switch 33 (the function of which will be described below) to reference voltage supply 3a for ADC 3. The BCL control signal controls the reference voltage for ADC 3 so as to reduce the values of digital luminance and chrominance samples and thereby reduce excessive beam currents produced by picture tube 21.

In accordance with another aspect of the present invention, previously mentioned switch 33 is responsive to the horizontal blanking pulse (HB) generated by deflection unit 25 to inhibit reference voltage source 3a from responding to the contrast BCL control signal. Thus conversion of the portions of the composite video signal encompassed by the duration of each horizontal blanking pulse, i.e., the respective horizontal synchronization pulse, blanking level and color burst component, is not affected by the beam current limiting operation. The purpose of this is to ensure that the values of the digital samples corresponding to the horizontal synchronization pulses and the color burst are not altered in accordance with the beam current. If this were not done, the digital samples corresponding to horizontal synchronization components could be reduced in value to a point at which they would go undetected by deflection unit 25 and the digital samples corresponding to the color burst component could be changed in value and thereby adversely affect various functions of chrominance processor 9 such as automatic chroma control (ACC).

In accordance with another aspect of the invention, a clamping circuit 35 is coupled to reference voltage supply 3a for ADC 3 to prevent the conversion of portions of the analog composite video signal near the black level (0 IRE units) from being substantially affected in response to the contrast BCL control signal. This prevents the loss of detail in dark portions of an image due to beam current limiting action.

BCL control unit 31 provides a sequential type of control in which no beam limiting action takes place for a relatively low amplitude range of beam current, the contrast BCL control signal causes continuous reduction of contrast for a medium amplitude range of beam current, and the brightness BCL control signal causes a continuous reduction of brightness while the contrast BCL signal maintains the contrast at the value reached in the medium range for a relatively high amplitude range of beam current. Sequential BCL control units of this type are described in U.S. Pat. No. 4,126,884 (Shanley, II) and U.S. Pat. No. 4,253,110 (Harwood et al.).

An implementation for performing the functions of ADC 3, ADC reference voltage supply 3a, switch 33 and clamp 35 will now be described with reference to FIG. 2. ADC 3 is a "flash" type analog-to-digital converter including a multi-tap resistive voltage divider 201 connected between a source of a stable relatively high voltage (VH) and a source of a stable relatively low voltage (VL) and a plurality of voltage comparators 203 having inverting (−) inputs coupled to respective taps of voltage divider 201 to form a ladder network and noninvertering (+) inputs coupled to receive the analog composite video signal. Voltage divider 201 supplies successively higher threshold voltages to the comparators starting with the comparator closest to the bottom of the figure. This arrangement forms a binary ladder network which generates a high logic level at the output of each comparator which receives a threshold voltage lower than the amplitude of the analog composite video signal. The comparators and corresponding resistors are labelled with decimal values to which they respectively correspond. The output of comparators 203 are coupled to a binary to grey code converter 205.

Code converter 205 may simply comprise a read-only-memory (ROM) look-up table arrangement. The digital samples representing the analog composite video signals are produced at the output of code converter 205.

An NPN transistor 207 arranged as an emitter-follower has its collector connected to the source of high voltage VH and its emitter coupled to the inverting input of the comparator corresponding to the highest digital value (127) through a diode 209. The contrast BCL control signal is coupled to the base of transistor 207. The voltage difference between the inverting input of the comparator corresponding to the highest digital value 127 and the inverting input of the comparator corresponding to the lowest digital value (1) corresponds to the reference voltage for ADC 3. The normal reference voltage condition occurs when transistor 207 is rendered nonconductive, as will be explained below, and the current flowing through diode 209 is at a relative high level causing the reference voltage to be at a relatively low level compared to the condition when transitor 207 is conductive. As indicated by the waveform, the contrast BCL control signal increases with increases in beam current (BC). Therefore, when transistor 207 is conductive, the current flowing through diode 29 decreases and the reference voltage for ADC 3 increases with increases in beam current. As the reference voltage increases, the threshold voltage for each of comparators 203 for values greater than 31 (as will be explained below) increases and the contrast decreases. The contrast is decreased at higher levels of reference voltage because at higher levels of reference voltage higher amplitudes of the analog composite video signal are required to produce the same digital values produced at lower levels of reference voltage. At a predetermined level of the BCL control signal, diode 209 will become reversed biased thus limiting contrast reduction to a corresponding limit. In essence, by controlling the reference voltage for ADC 3, contrast BCL control signal controls the range of values for the digital samples produced by ADC 3.

The horizontal blanking (HB) pulses, which for this embodiment are negative-going as indicated by the waveform, are coupled to the base of transistor 207 through an isolation diode 210 and causes transistor 207 to be rendered nonconductive. This inhibits changes in the contrast BCL control signal from affecting the conversion operation, i.e., it restores the normal reference voltage condition. Thus, coupling the horizontal blanking pulse to the base of transistor 207 corresponds to the function of switch 33 shown in the block diagram of FIG. 1.

The clamp circuit 35 of the block diagram of FIG. 1 comprises a Zener diode 211 coupled to the noninverting (threshold voltage) input of the comparator (31) corresponding to the black of O IRE level. Zener diode 211 prevents the threshold voltage corresponding to the black level (and the threshold voltages corresponding to analog composite video signal level below the black level) from being modified by the contrast BCL control signal.

While the various aspects of the invention have been described with respect to a specific embodiment, it will be appreciated that modifications, such as those for different polarity signals, are intended to be within the scope of the invention defined by the following claims.

What is claimed is:

1. In a digital television system including an analog-to-digital converter for converting a composite television signal, including both luminance and chrominance components, to corresponding digital samples, a digital processing section for digitally processing said digital samples to produce at least first and second groups of digital samples representing respective components of image information, a first digital-to-analog converter for producing a first analog signal corresponding to said first group of digital samples, a second digital-to-analog converter for producing a second analog signal corresponding to said second group of digital samples, a picture tube responsive to said first and second analog signals for producing an image and being capable of generating an excessive beam current in response to said first and second analog signals, apparatus for reducing said excessive beam currents comprising:

beam current control means coupled to said picture tube for generating a control signal representing the beam current generated by said picture tube; and analog-to-digital control means coupled to said analog-to-digital converter for controlling the range of values of said digital samples representing said analog composite television in response to said beam current representative control signal.

2. The apparatus recited in claim 1, wherein:
said analog-to-digital converter includes a reference voltage source for providing a reference voltage which determines the range of values of said digital samples representing said analog composite video signals; and
said analog-to-digital control means is coupled to said reference voltage source for controlling said reference voltage in response to said beam current control signal.

3. The apparatus recited in claim 1, wherein:
said analog-to-digital control means includes inhibiting means for inhibiting the operation of said analog-to-digital converter from being affected by said beam current control signal for predetermined portions of said analog composite television signal.

4. The apparatus recited in claim 3, wherein:
said predetermined portions include horizontal synchronization pulses of said analog composite television signal.

5. The apparatus recited in claim 4, wherein:
said predetermined portion also includes the blanking level regions of said analog composite television signal.

6. The apparatus recited in claim 5, wherein:
said predetermined portion also includes color burst intervals of said analog composite video signal.

7. The apparatus recited in claim 6, wherein:
said inhibiting means is responsive to horizontal blanking pulses generated by said digital processing section during a time interval encompassing respective horizontal synchronization pulses, blanking level regions and color burst intervals.

8. The apparatus recited in claim 1, wherein:
said analog-to-digital converter includes a reference voltage source for providing a reference voltage which determines the range of values of said digital samples representing said analog composite video signal;
said analog-to-digital converter control means is coupled to said reference voltage source for controlling said reference voltage in response to said beam current control signal; and
a clamping circuit is coupled to said analog-to-digital converter for maintaining the range of values of said digital samples for portions of said analog composite television signal from a black level toward synchronization pulse tips substantially unaffected by said beam current control signal.

* * * * *